United States Patent [19]

Thompson et al.

[11] Patent Number: 5,363,557
[45] Date of Patent: Nov. 15, 1994

[54] METHOD FOR FORMING A CRANKSHAFT BEARING HAVING HYDRODYNAMIC THRUST FLANGES

[75] Inventors: Ronald J. Thompson, Howell; Ned L. Misner, Stanton; Michael D. Winegard, Greenville, all of Mich.

[73] Assignee: Federal-Mogul Corporation, Southfield, Mich.

[21] Appl. No.: 182,308

[22] Filed: Jan. 13, 1994

Related U.S. Application Data

[63] Continuation of Ser. No. 957,300, Oct. 6, 1992, abandoned, which is a continuation of Ser. No. 810,225, Dec. 19, 1991, Pat. No. 5,192,136.

[51] Int. Cl.⁵ ............................................. F16C 33/14
[52] U.S. Cl. .................... 29/898.041; 29/898.02; 29/898.13; 72/379.6
[58] Field of Search ............ 29/898.02, 898.041, 29/898.13; 72/379.6; 384/286–289, 294, 107, 112, 121, 123, 322, 368, 429, 430

[56] References Cited

U.S. PATENT DOCUMENTS

| | | | |
|---|---|---|---|
| 4,326,758 | 4/1982 | Nozue et al. | 384/368 |
| 4,348,065 | 9/1982 | Yoshioka et al. | 384/121 |
| 4,437,215 | 3/1984 | Nozue et al. | 29/898.041 |
| 4,488,826 | 12/1984 | Thompson | 384/288 |
| 4,599,147 | 7/1986 | Thompson | 205/122 |
| 4,644,624 | 2/1987 | Fontana | 29/898.041 |
| 4,702,624 | 10/1987 | Fontana | 384/276 X |
| 4,714,356 | 12/1987 | Damour et al. | 384/294 X |
| 4,726,695 | 2/1988 | Showalter | 384/121 |
| 4,771,744 | 9/1988 | Corbett | 384/123 X |

FOREIGN PATENT DOCUMENTS

| | | | |
|---|---|---|---|
| 3736340 | 5/1989 | Germany | 384/123 |
| 62-12305 | 3/1987 | Japan | 29/898.041 |
| 1396880 | 6/1975 | United Kingdom | 29/898.041 |

*Primary Examiner*—Mark Rosenbaum
*Assistant Examiner*—S. Thomas Hughes
*Attorney, Agent, or Firm*—Lawrence J. Shurupoff

[57] ABSTRACT

A split crankshaft bearing assembly includes two flanged half bearings adapted to collectively encircle a crankshaft. The flanges are formed with oil supply grooves that subdivide the flange surface into thrust bearing pads. Each pad includes a positively sloped ramp surface leading to a raised land surface. The rotating crankshaft drags a film of oil onto the land surface where it provides hydrodynamic thrust support for the shaft. To facilitate close tolerance control on the thrust bearing pad contour, the manufacturing process is carried out so that the oil supply grooves are formed and the thrust face presized prior to formation of the pad final contour. The pad contour is formed by a coining operation.

6 Claims, 2 Drawing Sheets

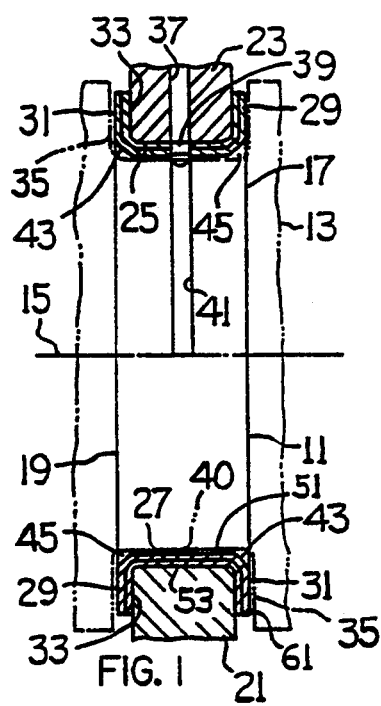

METHOD FOR FORMING A CRANKSHAFT BEARING HAVING HYDRODYNAMIC THRUST FLANGES

This is a continuation of co-pending application Ser. No. 957,300 filed on Oct. 6, 1992, now abandoned, which is a continuation of Ser. No. 810,225 filed Dec. 19, 1991, now U.S. Pat. No. 5,192,136.

BACKGROUND OF THE INVENTION

1. Field of the Invention

This invention relates to crankshaft bearings, and especially to such bearings having flanges designed to accommodate high thrust loads.

2. Description of Prior Developments

It is common practice to support internal combustion engine crankshafts with radial bearings located at spaced points along the crankshaft. For example, for an in-line 4-cylinder or V-8 engine, five equidistantly spaced bearing assemblies are used. Each bearing assembly includes an upper half bearing seated in an arcuate recess in the lower part of the engine cylinder block, and a lower half bearing seated in an arcuate cap structure. The cap structure is bolted to the cylinder block to retain the half bearings encircled around the crankshaft.

At least one of the bearing assemblies is designed to absorb axial thrust forces applied through the crankshaft and received from accessory drive mechanisms such as automatic transmissions. Each half bearing in such a bearing assembly has two axially-spaced flanges designed to seat against side surfaces of the shaft crank arms such that the shaft is prevented from shifting in the axial direction.

In some high performance engines considerable axial thrust is generated in the engine crankshaft during certain operational periods, e.g., during periods of rapid acceleration and deceleration. Very large axial thrust loads may also be developed by the action of the torque converter in the engine transmission. Toroidal motion of the transmission fluid in the torque converter tends to force the impeller and turbine apart, thereby imparting a significant axial thrust force to the crankshaft. The crankshaft thrust bearing is required to absorb such thrust forces.

Axial thrust forces are absorbed by only one or two of the crankshaft half bearings since manufacturing tolerance stack-ups tend to prevent the flanges of multiple bearing assemblies from simultaneous precise pressure contact with multiple axially-spaced surfaces on the crankshaft. When the thrust load is borne by a single flanged bearing assembly, the unit area pressures on the thrust bearing surfaces are relatively high.

Flanged half bearings for rotary crankshafts are shown in U.S. Pat. No. 4,599,147 and U.S. Pat. No. 4,702,624 and U.S. Pat. No. 4,714,356. The half bearings shown therein have radial thrust bearing flanges equipped with oil supply groves or pockets for distributing oil on the flange surfaces, thereby providing at least a partial oil film support between the rotary shaft runner surface and the stationary thrust bearing surface. U.S. Pat. No. 4,488,826 shows the use of wedge film hydrodynamic support applied to a radial bearing construction.

Under high axial thrust load conditions, the oil film support provided by prior art bearings may not always be sufficient to maintain a desired separation between the shaft and the thrust bearing. The oil may be squeezed out of the bearing-shaft interface so as to permit metal-to-metal contact and associated wear of the thrust bearing flange surface.

SUMMARY OF THE INVENTION

The present invention is directed to a one-piece flanged half bearing for an engine crankshaft and to a method for forming hydrodynamic contours on such a flanged bearing.

In one form of the invention, each radially extending annular flange of the half bearing has a set of oil supply grooves subdividing the flange surface into a number of thrust bearing pads. Each pad has a surface contour that includes a first positively sloped ramp surface extending circumferentially from a first oil supply groove to a land surface contiguous to the first ramp surface, and a second negatively sloped ramp surface extending circumferentially from the land surface to a second oil supply groove.

An alternate design includes a first positively sloped ramped surface extending circumferentially from a first oil supply groove to a second segment of essentially zero slope surface extending circumferentially to the second oil supply groove.

The first ramp surface has a progressively closer spacing relative to the shaft surface so that while the shaft is rotating it drags oil along the ramp surface and onto the land surface or zero slope surface. A substantially continuous film of oil is maintained and replenished on each thrust bearing pad.

The oil film, which may be about 0.00002 inch thick on each land surface, is wedged between the pad and shaft surfaces to provide a hydrodynamic thrust support for the shaft thereby minimizing shaft wear and prolonging the shaft service life under high axial loading conditions. Although wedge film thrust bearings are known in the art, the use of wedge film thrust support action in one-piece engine crankshaft half bearings is believed to be new in the art.

In carrying out the invention, the slope of each ramp surface and the height of each land surface should be precisely controlled otherwise the desired oil film thickness on the bearing pads may not be maintained. In order to precisely control the manufacturing tolerances on each thrust bearing pad contour, and at the same time maintain the precise dimensional requirements previously dictated for bearing overall length and distance between flanges, it is proposed to form the hydrodynamic contours on the thrust face after the oil supply grooves and thrust face have been finish-sized to print specifications.

Oil supply grooves, if present, may be a separate machining operation. If oil supply grooves are provided on the thrust flanges, the ramp surfaces and land surfaces are formed after formation of the oil supply grooves. Preferably, a contoured coining die is moved against a flat face on the thrust flange of the half bearing. The contour of the coining die is such that selected areas on the thrust flange surface are displaced laterally to provide the desired ramp surfaces and land surfaces.

Although coining is preferred, any other metal deformation technique, such as rolling, may be used to form the ramp and land surfaces. In this context, the term "metal deformation" is meant to include both coining and rolling as opposed to a metal removal process such as milling or grinding.

Because the oil grooves are already formed when the metal deformation operation takes place, there is only a relatively small displacement of flange material during this operation. By displacing or deforming only a small amount of material, close tolerances may be maintained or even improved during this operation. Moreover, since the thrust flange surface is preferably formed by a layer of relatively soft anti-friction metal material, e.g. an aluminum-lead alloy or an aluminum-tin alloy, it is possible to precisely control the contours on the thrust bearing pad without extensive machining or finishing operations. The oil supply grooves provide a region for the bearing material to easily flow into during the coining operation thereby allowing the use of a relatively low force coining press.

THE DRAWINGS

FIG. 1 is fragmentary sectional view through a crankshaft bearing assembly embodying features of the invention.

FIG. 2 is a right end view of the FIG. 1 bearing assembly.

FIG. 3 is a sectional view taken on line 3—3 in FIG. 2.

FIG. 4 is a view taken in the same direction as FIG. 3, but illustrating another structure embodying the invention.

DETAILED DESCRIPTION OF THE PREFERRED EMBODIMENTS

Figure 5:
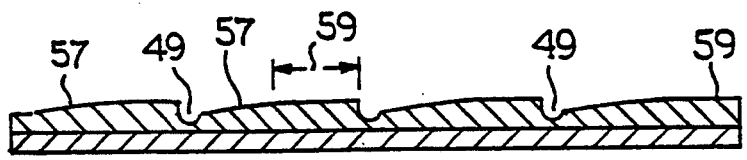
FIG. 5 is taken in the same direction as FIG. 3 but illustrating another structure embodying the invention.

FIGS. 1 and 2 show a bearing assembly 11 for rotatably supporting an engine crankshaft 13 as shown fragmentally in phantom in FIG. 1. The crankshaft is supported for rotation around axis 15. Several bearing assemblies 11 are located at spaced points along shaft axis 15 to provide complete support for the shaft. Only one of the bearing assemblies is shown for purposes of illustration.

Bearing assembly 11 includes an upper half bearing 17 and a lower half bearing 19. These two half bearings are collectively mounted as a unit on the lower end of an engine cylinder block by a cap structure 21. Two bolts extend through ears on cap structure 21 into threaded holes in cylinder block wall 23 to rigidly attach bearing assembly 11 to the cylinder block in a known fashion.

The lower face of wall 23 has a semi-circular cavity or recess which mates with a semi-cylindrical wall 25 of half bearing 17, whereas the upper face of cap structure 21 has a semi-circular cavity or recess which mates with semi-cylindrical wall 27 of half bearing 19. When the cap structure is bolted to the cylinder block the two half bearings are rigidly clamped to the cylinder block in encircling relation to crankshaft 13. This mounting arrangement for the bearing assembly is conventional.

Half bearing 17 has two semi-circular flange walls 29 extending radially and perpendicularly from the convex surface of semi-cylindrical wall 25. Similarly, half bearing 19 has two semi-circular flange walls 29 extending perpendicularly from the convex surface of semi-cylindrical wall 27. Each flange wall 29 has an external axially-facing surface 31 and an internal axially-facing surface 33. Each external axially-facing surface 31 acts as a thrust bearing surface and prevents axial play of crankshaft 13 in the bearing assembly. Annular shoulders 35 are formed on the crankshaft along side surfaces of the crank arms.

Pressurized lubricating oil is supplied to the bearing assembly through a hole or port 37 in wall 23. A mating slot or hole 39 in wall 25 of the upper half bearing delivers the oil to a groove 41 formed in the concave surface of wall 25. As the crankshaft rotates around shaft axis 15 the oil is carried by the rotating shaft surface 40 onto the concave surface of semi-cylindrical wall 19 in the lower half bearing. A ring of oil encircles the circular shaft surface 40 to provide hydrodynamic radial support for the shaft. The concave surfaces of semi-cylindrical walls 25 and 27 constitute radial bearing surfaces.

Each semi-cylindrical wall 25 and 27 intersects the associated flange wall 29 to form a chamfered corner 43 between the concave surface of walls 25 and 27 and thrust bearing surface 31. The chamfer angle is preferably about forty-five degrees. Oil flows into a triangular cross-sectioned cavity 45 formed between the bearing and the shaft surfaces. Rotational motion of the shaft drags the oil along the triangular cavity in the direction of shaft rotation. In the FIG. 2 arrangement the shaft rotational direction is designed by arrow 47 which indicates that the oil flows within cavity 45 in a counter-clockwise direction as generally viewed from the rear of the engine.

Each half thrust bearing surface 31 may have two or more oil flow recesses, valleys or supply grooves 49 extending from chamfered corner 43 to the outer peripheral edge of the associated flange wall 29. As illustrated, these two oil supply grooves subdivide the thrust bearing surface into three thrust bearing pads 50. Each pad is contoured to induce a circumferential flow of oil along the pad surface in the same direction as oil flowing within cavity 45, i.e. counterclockwise in FIG. 2.

End areas of half bearings 17 and 19 are abutted together, as at 20 in FIG. 2. Flange walls 29 may have their ends angled or cut away, as at 22, to provide triangular shaped free spaces in near proximity to chamfer corner surface 43, and they have a thrust face relief area such that oil can flow radially outwardly for contact with the rotating shaft surface 35. Cut-away areas 22, thrust relief areas and oil flow grooves 49 constitute oil supply zones for supplying oil to shaft surface 35.

Although discrete oil flow grooves 49 are depicted in the drawings, oil may be adequately supplied through recesses formed during the metal deformation process used to forth the contoured thrust bearing pad surfaces 50. As seen in phantom in FIG. 6, relatively shallow grooves 49' may be formed as a continuous smooth sinuous extension of pad surfaces 50 during a coining or rolling operation.

The thrust bearing surfaces 31 and the radial bearing surfaces on walls 25 and 27 are preferably formed of a relatively soft metallic anti-friction material, e.g., preferably but not limited to an aluminum-lead alloy or an aluminum-tin alloy. In a preferred practice of the invention, each half bearing 17,19 is formed of a one-piece bimetal sheet wherein one layer is an anti-friction metal alloy and the other layer is steel backing. In the drawings the anti-friction layer is designated by numeral 51, and the steel layer is designated by numeral 53.

For one application, the overall thickness of the laminated bimetal sheet may be about 0.08 inch. The sheet is configured and oriented so that the anti-friction layer forms the radial bearing surface and the thrust bearing surfaces. The steel layer supports the half bearing on cap structure 21 and on cylinder block wall 23.

FIG. 3 is a representation of the circumferential profile of the thrust bearing surface 31, but transformed into a single flat plane for ease of illustration. Each surface section 55 is flat, i.e. zero slope. Each surface section 57 has a positive slope and each surface section 58 has a negative slope measured in relation to shaft surface 35 and in the direction of shaft rotation designated by numeral 47.

In a pictorial sense, each surface section 57 acts as an inclined ramp to transport oil in the direction of arrow 47 onto a contiguous raised land surface 59. Although it is advantageous to provide a flat land surface 59 between each ramp surface 57,58, a rounded or peaked region could be substituted for the land surface 59.

The viscous oil is drawn by shaft surface 35 up the ramp surface 57 and forced into the narrow axial passage formed by shaft surface 35 and raised land surface 59. The induced circumferential oil flow increases the oil pressure above land surface 59, thereby achieving a hydrodynamic support action suitable for handling relatively high thrust loads. The effect is sometimes referred to as film wedge hydrodynamic lubrication.

In the FIG. 3 arrangement there are two discrete oil supply grooves 49 for each half bearing, plus two additional oil passages provided by the flared ends 22 of the flange walls 29. Additionally, some oil can flow from triangular cavity 45 directly onto flat 55 or ramp surface 57. The shaft rotational motion enables shaft surface 35 to draw the oil along ramp surfaces 57 and onto land surfaces 59. Eventually the oil flows across the outer peripheral edges of the flange walls 29, which are preferable bevelled or rounded, as at 61 (FIG. 1).

The pad surface contours are somewhat exaggerated in FIG. 3. In practice each oil groove 49 has a depth of about 0.02 inch and a width of about 0.2 inch. Each land surface 59 is elevated above the associated flat 55 by a distance which can vary from about 0.0005 inch to about 0.0035 inch, and, in general, no more than about 0.008 inch. The height and shape of each ramp surface 57 must be carefully controlled to achieve satisfactory performance. A continuous sinuous surface may be substituted for the discrete oil grooves 29, flats 55 and land surfaces 59 having similar dimensions to those identified immediately above.

In the case where discrete oil supply grooves 49 are formed by machining, it is preferred to form surfaces 55, 57 and 58 after the oil supply grooves 49 have been formed in order to closely control the height of each land surface 59 relative to flat surface 55. Each groove 49 can be formed by machining the groove in a flat radial surface of the associated flange wall 29. Thereafter, a coining die with a suitable contour can be advanced against the flat radial surface of the flange walls to form surfaces 55, 57 and 58. At this point in the manufacturing process, the coining of the flanges actually improves some of the prior manufacturing tolerances such as the perpendicularity between the flange wall 29 and the walls 25,27 of half bearings 17,19, and it also improves the flange thickness dimensional control.

Figure 6:
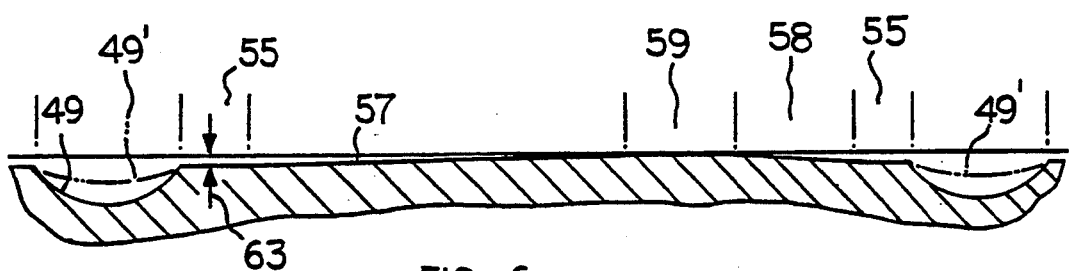
FIG. 6 is a fragmentary enlarged view of a portion of the surface contour shown on a reduced scale in FIG. 3.

FIG. 6 shows the thrust bearing pad surface contour on an enlarged scale. Dimension 63 represents a distance of about 0.002 inch. If large amounts of material are displaced when forming the hydrodynamic contours, the bearing can be deformed out of shape thereby resulting in the scrapping of the part. By machining each groove 49 and finish sizing the flange face thickness prior to the coining operation, a relatively close tolerance control on surfaces 55, 57 and 59 becomes possible because comparatively small quantities of material have to be displaced during the coining operation. When large amounts of material are displaced, satisfactory tolerance control becomes difficult, if not impossible, thereby resulting in a distorted unusable bearing.

Figure 7:
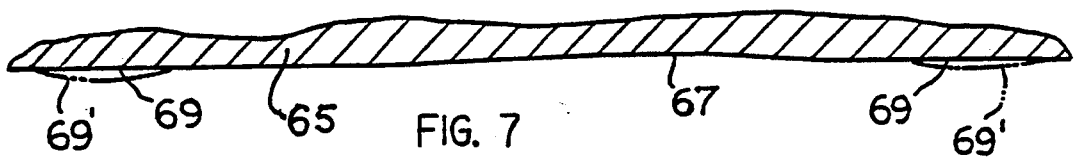
FIG. 7 is a fragmentary sectional view taken through a coining die used to form the surface contour depicted in FIG. 6.

FIG. 7 fragmentarily shows a coining die 65 having a die surface 67 contoured to form the bearing pad surface curvature depicted in FIG. 6. Surface areas 69 of the die that mate with oil grooves 49 are flat (zero slope), such that the die does not penetrate into the oil grooves and no die alignment feature is required to locate a die groove to previously machined thrust face grooves. Alternatively, surfaces areas 69 could be formed with projections 69' to form the shallow recesses 49' shown in FIG. 6. Various conventional stamping and machining techniques can be used to form each half bearing to a desired configuration suitable for machining the oil grooves, thrust face and embossing the thrust pad surfaces.

The number of oil grooves and thrust bearing pads can be varied within practical limits. FIG. 4 pictorially shows an arrangement having three oil supply grooves and four thrust bearing pads. For best operation, each positively sloped ramp surface 57 should have a relatively small slope angle to promote a good circumferential flow of oil. This means that each ramp surface should be relatively long, in which case the land surface 59 will be relatively far away from the oil supply point 22 or 49 and relatively near to the next oil groove or cut-away zone 22.

FIG. 3 shows a desired arrangement which provides superior thrust load performance. FIG. 4 shows another arrangement wherein each land surface 59 is located equidistant from the oil supply zones 22 or 49. With the FIG. 4 arrangement the system is operable irrespective of the direction of circumferential oil flow, i.e. clockwise or counterclockwise. FIG. 5 shows yet another embodiment of the invention wherein a slightly curved or flat ramp surface 57 leads to a flat planar land surface 59 which in use is parallel to shoulder surface 35 and to thrust flange wall 29.

The drawings necessarily show specific structural features and relationships. However, it will be appreciated that some changes and modifications can be made while still practicing the invention. For example, analytical methods used to calculate oil film thickness on the thrust face of typical automotive thrust bearings suggest that up to 10 grooves with the corresponding 11 contoured surfaces may be used to increase thrust bearing load capability.

What is claimed is:

1. A method of forming a half bearing for an engine crankshaft, said half bearing comprising a semi-cylindrical wall and a radially-extending semi-cylindrical thrust flange comprising a steel backing and a relatively soft anti-friction material, said flange being located on an axial end portion of said wall, wherein said method comprises forming an oil supply groove in said relatively soft anti-friction material with a first machine operation and forming a hydrodynamic contour on said relatively soft anti-friction material adjacent said oil supply groove with a second machine operation which comprises a metal deformation operation which deforms said relatively soft anti-friction material laterally toward said oil supply groove.

2. The method of claim 1, further comprising presizing said thrust flange by machining material from said thrust flange.

3. The method of claim 1, wherein said metal deformation operation comprises a coining operation.

4. The method of claim 1, further comprising coining said hydrodynamic contour in the form of thrust bearing pads.

5. The method of claim 1, wherein said metal deformation operation comprises coining said hydrodynamic contour in the shape of a ramped surface.

6. A method of forming a half bearing for an engine crankshaft, said half bearing comprising a semi-cylindrical wall and a radially-extending semi-cylindrical thrust flange comprising a steel backing and a relatively soft anti-friction material, said flange being located on an axial end portion of said wall, said thrust flange comprising a hydrodynamic ramp surface formed on said anti-friction material and having a height within a range of 0.0005 inch to 0.0035 inch, wherein said method comprises forming an oil supply groove on said thrust flange with a first machine operation and forming said hydrodynamic ramp on said anti-friction material adjacent said oil supply groove with a second machine operation which comprises a metal deformation operation which deforms said anti-friction material laterally toward said oil supply groove.

* * * * *